US012162301B2

(12) United States Patent
Maccaferri et al.

(10) Patent No.: US 12,162,301 B2
(45) Date of Patent: Dec. 10, 2024

(54) APPARATUS FOR TRANSFERRING, FIXING AND POLISHING IMAGES PRINTED ON PLASTIC OR METAL SURFACES OF THREE-DIMENSIONAL OBJECTS

(71) Applicant: G.M.C. DI G. MACCAFERRI E CLAUDIO S.N.C., Modena (IT)

(72) Inventors: Claudio Maccaferri, Modena (IT); Alberto Maccaferri, Modena (IT); Elia Maccaferri, Modena (IT)

(73) Assignee: G.M.C. DI G. MACCAFERRI E CLAUDIO S.N.C., Modena (IT)

(*) Notice: Subject to any disclaimer, the term of this patent is extended or adjusted under 35 U.S.C. 154(b) by 0 days.

(21) Appl. No.: 17/921,630

(22) PCT Filed: Apr. 30, 2021

(86) PCT No.: PCT/EP2021/000056
§ 371 (c)(1),
(2) Date: Oct. 27, 2022

(87) PCT Pub. No.: WO2021/223900
PCT Pub. Date: Nov. 11, 2021

(65) Prior Publication Data

US 2023/0166552 A1 Jun. 1, 2023

(30) Foreign Application Priority Data

May 8, 2020 (IT) ........................ 102020000010171

(51) Int. Cl.
*B41M 7/00* (2006.01)

(52) U.S. Cl.
CPC .................................... *B41M 7/009* (2013.01)

(58) Field of Classification Search
CPC .... B41M 7/009; B41M 1/40; B41M 2205/30; B41M 5/03
See application file for complete search history.

(56) References Cited

U.S. PATENT DOCUMENTS

| | | | | |
|---|---|---|---|---|
| 5,234,784 | A * | 8/1993 | Aslam | G03G 13/01 430/124.13 |
| 8,551,270 | B2 * | 10/2013 | Previty | C09J 7/22 156/84 |
| 2001/0032554 | A1 | 10/2001 | Fritz et al. | |
| 2005/0167035 | A1 * | 8/2005 | Laskey | B44C 1/105 156/233 |
| 2009/0056858 | A1 * | 3/2009 | Davila Casitas | G03H 1/028 156/277 |
| 2012/0060707 | A1 | 3/2012 | Chigono | |

(Continued)

FOREIGN PATENT DOCUMENTS

WO WO2012/088053 A1 6/2012

*Primary Examiner* — David H Banh
(74) *Attorney, Agent, or Firm* — John Alumit

(57) ABSTRACT

The object of this invention is to transfer, fix and polish images produced by: toner laser printers or inkjet printers, flexographic technology, silkscreen technology, offset technology, printed on reel support (A), on the plastic or metal surface of three-dimensional objects (16), thanks to which it is possible to detach images from the reel support (A) and subsequently transfer them to the surface of said plastic or metal objects (16) by a thermomechanical (1, 10) action.

11 Claims, 4 Drawing Sheets

(56) References Cited

U.S. PATENT DOCUMENTS

| | | | | |
|---|---|---|---|---|
| 2012/0195652 | A1* | 8/2012 | Takahashi | G03G 15/2028 399/323 |
| 2015/0234276 | A1* | 8/2015 | Gotsick | G03F 7/2022 118/620 |
| 2016/0154308 | A1* | 6/2016 | Fronczkiewicz | G03F 7/202 430/306 |
| 2017/0231876 | A1* | 8/2017 | Park | B29D 7/01 424/401 |
| 2018/0264803 | A1* | 9/2018 | Hoshino | B41J 15/08 |
| 2018/0267640 | A1* | 9/2018 | Virgili | G06F 3/016 |
| 2020/0254803 | A1* | 8/2020 | Cassoni | B41F 16/008 |

* cited by examiner

APPARATUS FOR TRANSFERRING, FIXING AND POLISHING IMAGES PRINTED ON PLASTIC OR METAL SURFACES OF THREE-DIMENSIONAL OBJECTS

DISCLOSURE OF INVENTION

The object of this invention is to transfer, fix and polish images produced by: toner laser printers or ink jet printers, flexographic technology, silkscreen technology, offset technology, and printed on reel support material, on plastic or metal surfaces of three-dimensional objects by this invention thanks to which it is possible to detach images from the support and subsequently transfer them to the surface of said plastic or metal objects by a thermomechanical action. This invention enables the quality of the transferred images to be increased, enhancing the images transferred to the surface of the object in question by making the images gloss, matt, holographed avoiding the use of chemical products for the finish (such as for example lacquer, solvent); this invention also makes it possible their subsequent handling and increases their transfer speed. Thanks to this invention, it is possible to increase work flexibility, to use different printing techniques, to make work less costly by reducing the steps of handling the decoration and the amount of materials used, and to reduce the amount of energy used in the transfer and fixing processes.

One object of the present invention is thus to provide the prior art with an apparatus for fixing digital images printed on a support in reel material (A) such as paper or plastic film such, as for example, polyester of minimum thickness and with different finishes; this apparatus is provided with conveying means for said support, with at least one hot fixing roller (10) connected mechanically to at least one generator (1) of blown hot air, called a melter, and at least one non-heated workpiece holder (11) opposite said hot roller (10), where said melter comprises at least one conveying chamber (3) of the air that maintains the hot air on the surface of the hot roller (10), provided with a continuous rotary movement, with at least one mechanical element (13), known as a delayed detachment element, provided with a translating movement, where this movement can be integral with or independent of the translation of the hot roller to the object and is suitable for modifying the path of the film, maintaining the latter in contact with the object, after the transfer of the image to give the image a gloss, matt or holographed finish according to the finish of the support owing to the delayed detachment of the film from the object that enables the ink to be solidified, copying the quality of the surface of the film.

The aforesaid apparatus is associable with a machine for electrographic laser printing.

BRIEF DESCRIPTION OF DRAWINGS

The embodiment of the invention illustrates the transferring, fixing and finishing apparatus in FIGS. 1-2-3-4.

In detail, the transferring, fixing and finishing apparatus is outlined in FIGS. 1-2-3-4.

The presence of a support for the images (A) and of a transfer unit is disclosed.

BEST MODE FOR CARRYING OUT THE INVENTION

In detail, the transferring, fixing and finishing apparatus illustrated in FIGS. 1-2-3-4 comprises:

1) A support reel (A) for the images, said reel being able to be:
   - a reel of plastic film of polyester or paper with detaching features, for example silicon-coated at least on the printed side, where this support is printed by an electrographic laser printer with digital images with thermoplastic ink in powder, called toner, where this support has a gloss, matt or holographed surface finish to give the final product this feature;
   - a reel of polyester or paper film treated with heat release, transfer release materials commonly known as coating, printed by silkscreen, ink jet, offset or flexographic printing, where this support has an matt, gloss or 3D finish that is suitable for transmitting this feature to the end product.

The aforesaid reel is inserted into the apparatus of the present apparatus, provided with conveying means for support for the images.

Figure 1:
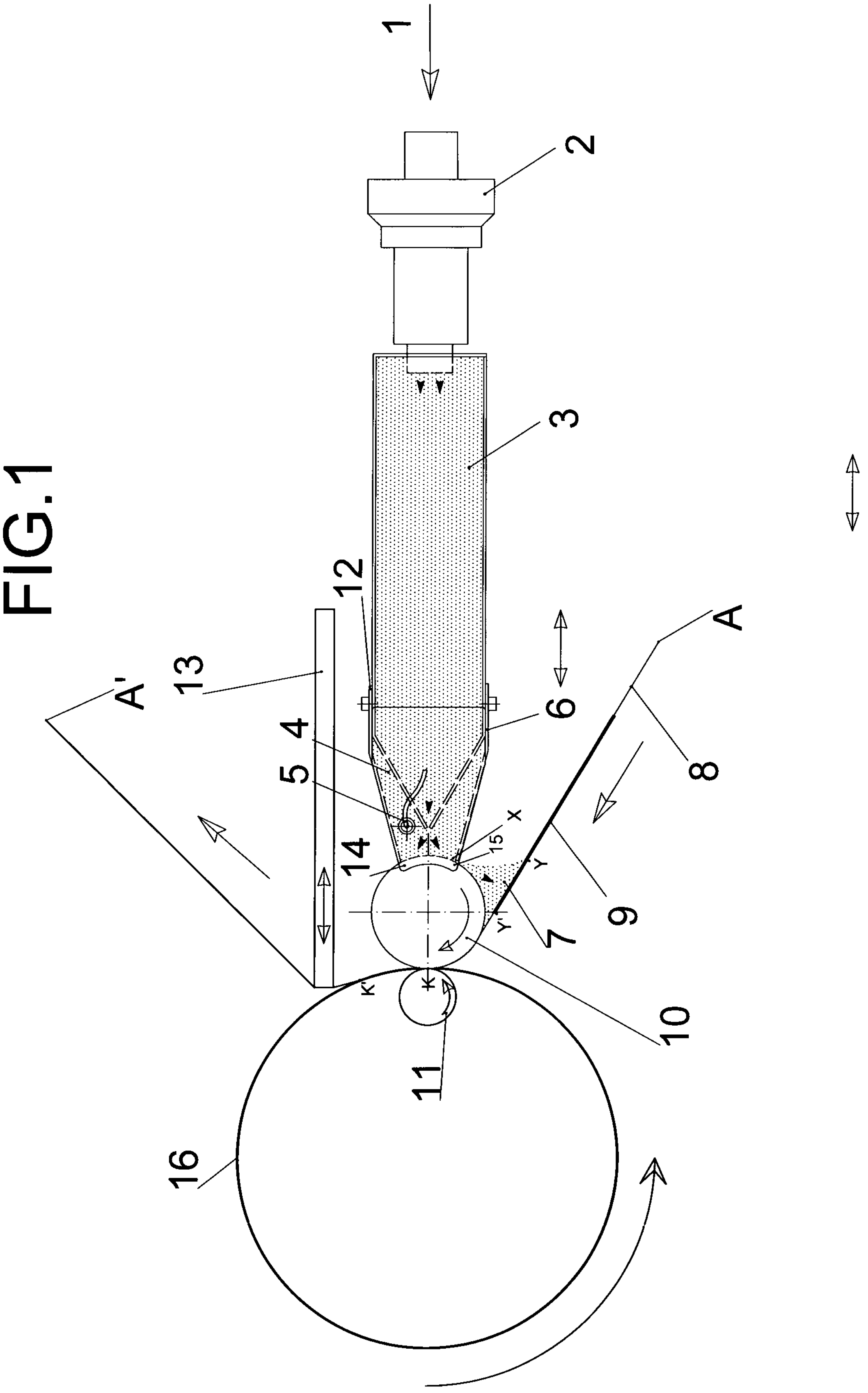

The transfer unit in turn comprises, in turn, a fixing roller, or hot roller, indicated by reference 10 in FIG. 1, connected mechanically to a melter 1 having the function of making the toner plastic or activating the ‘coating’ for non-thermoplastic inks to enable the image to be detached from the decorated support film (A) and then to fix the ink of the image to the surface of the object made of plastic or metal thanks to the compression of the printed film onto the object supported by the non-heated workpiece holder 11 opposite the hot roller.

The hot roller 10 is made from a core of aluminium or another material having a reduced specific weight and reduced volume; said core is then clad in highly non-stick rubber having hardness (50-90 ShA) and thickness preferably comprised between 1 mm and 5 mm; in addition, it has a high degree of surface finish and resistance to heat up to 300° C. This hot roller is movable and this movement is integral with the melter (3). Movement of the hot roller 10 and the melter 1 is controlled and directed to the workpiece holder and return. The hot roller 10 is thus provided with rotary movement that is continuous and adjustable and with translating movement that is integral with the melter.

Figure 2:
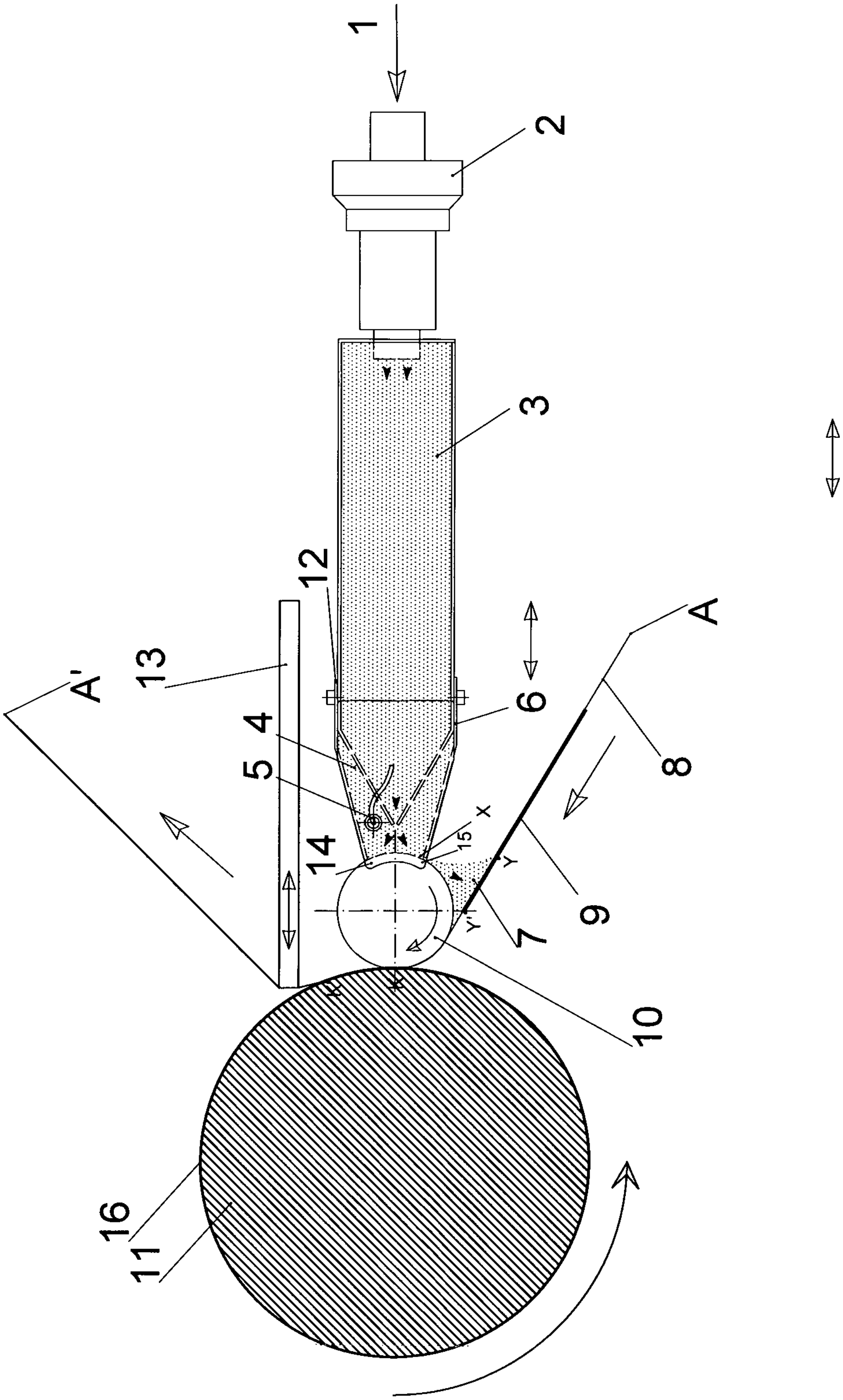
Figure 3:
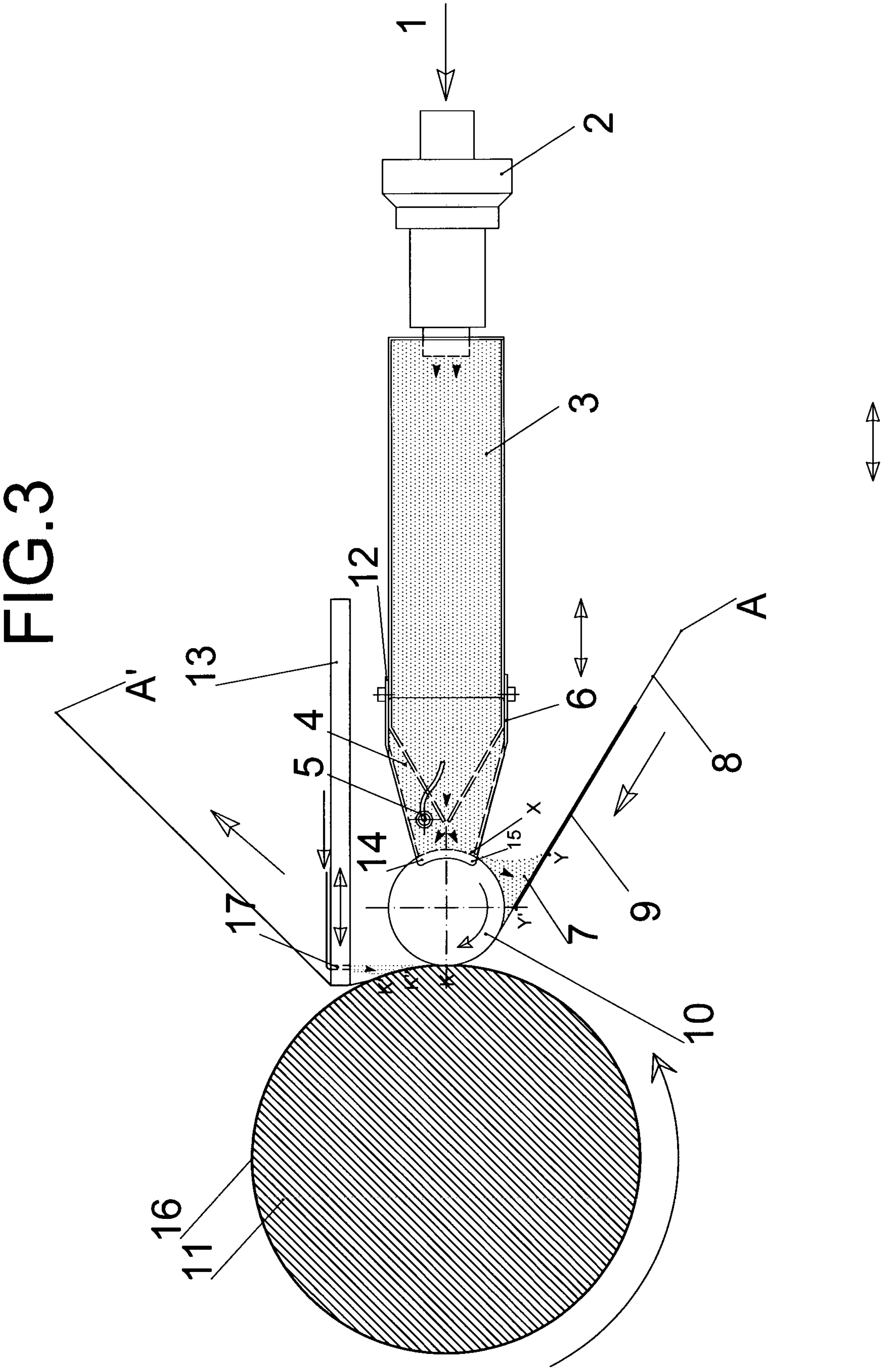
Figure 4:
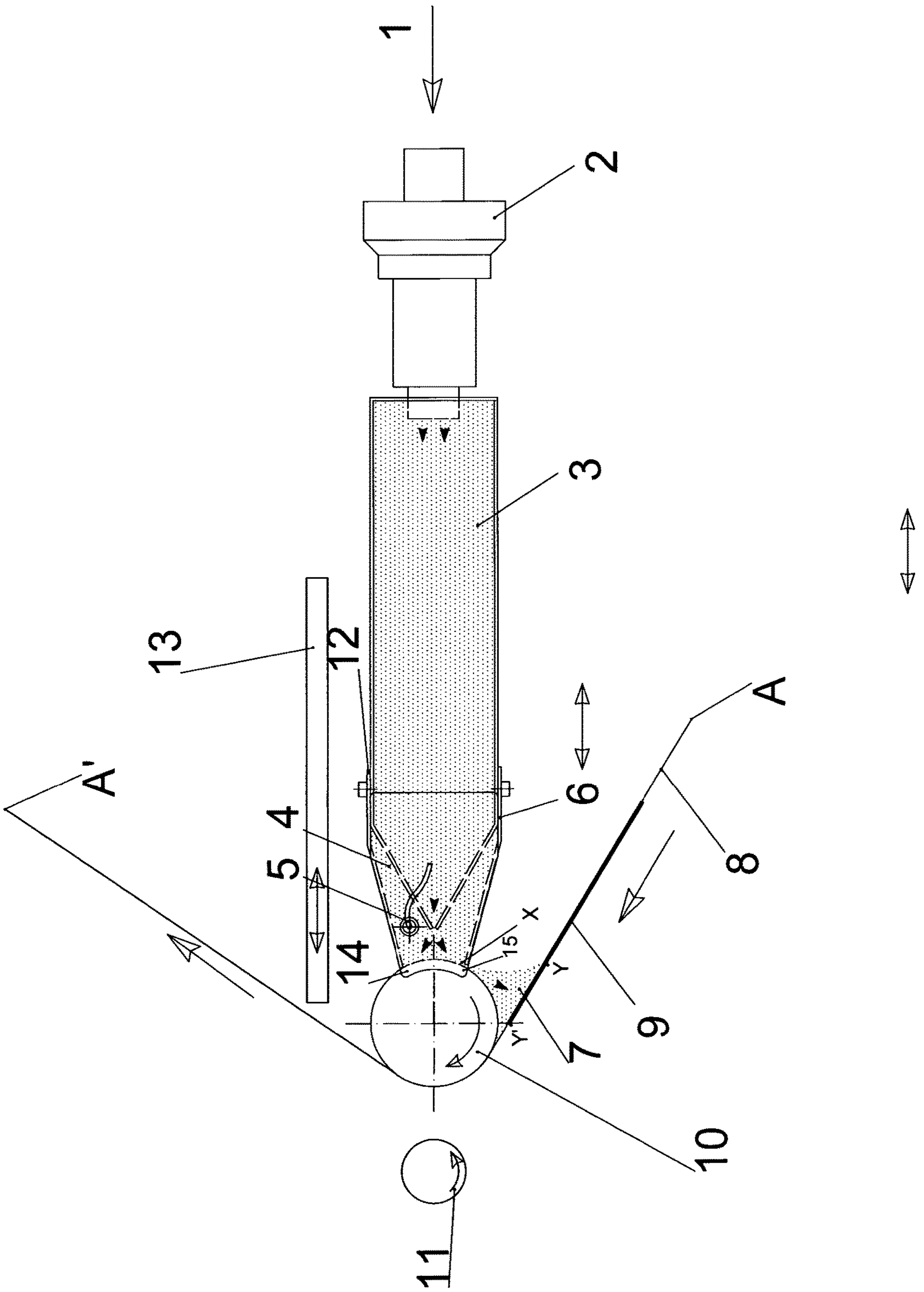

The non-heated workpiece holder 11 is opposite the hot roller 10 and it is composed of a pin of hardened and tempered steel (FIG. 1) that is able to oppose the hot roller when said hot roller approaches said tool holder to transfer the image where said tool holder can be made from an aluminium screw tap (spindle) having the same geometry as the object to be decorated, matching completely with the volume of the object to be decorated (FIGS. 2-3). This tool holder 11 is provided with rotary movement with adjustable speed.

There is a generator 1 of blown hot air, referred to below also as a melter, which is connected mechanically to the hot roller.

Said generator 1 comprises in turn at least one conveying chamber 3 of the air sent by a blower at adjustable flow and adjustable pressure, and at least one containing chamber 4 that maintains the hot air on the surface of the hot roller 10, provided with continuous rotary movement, where heating of the air is obtained by adjustable electrical resistances.

The outlet section of the conveying chamber 3 acts as a converging nozzle to increase the speed of the hot air directed at the hot fixing roller 10 and maintained inside the containing chamber 4 defined by side walls 6 and 12, an upper wall 14 and a lower wall 15 adjacent to the hot roller 10. In this manner, the aforesaid melter 1 maintains the hot air blowing on a surface portion XX' of the roller 10 both during the transfer and during the unloading of the object (FIG. 4) when the elements: hot roller, melter, delayed detachment element move backwards to enable the object to be unloaded. This portion XX' is dimensioned depending on the rotation speed and thermal energy to be given to the hot roller.

Also, thanks to the containing chamber 4, the transfer of heat to the surface of said hot fixing roller 10 is maximized and heat loss is minimized.

The side wall 6 of the containing chamber 4 is movable, so as to be able to be moved away from the hot roller, opening an adjustable orifice and causing an escape of hot air directed towards the back of the printed image, section YY'; the purpose of all this is to accelerate the transfer process, thus contributing to making the toner plastic, a thermoplastic ink in the case of toner laser printing or activating the coating in the case of ink jet printing, silkscreen printing, offset printing, or flexographic printing before compression of the film against the object, as well as to reduce the heat loss by the hot roller which compresses the preheated film.

Adhesion of the ink of the images to the objects is to be attributed to the subsequent combined action of pressure and temperature by the hot roller 10 onto the film interposed between the hot roller 10 and the object supported by the tool holder 11.

In addition, the aforesaid melter 1 is so configured as to have a temperature, air flow and position of the melter with respect to the hot roller 10 that are adjustable to give the necessary energy to the outer surface of the hot roller 10.

According to a further aspect of the invention, the generator 1 comprises, integrated into the system, a temperature sensor 20, for example a thermocouple, which permits precision in the continuous control of the hot air; the blown hot air can reach 400° C., being the power of the system adjustable.

A further sensor 18 is provided that is able to detect the temperature of the surface of the hot roller that, interconnected with the control electronics, enables the temperature of the hot air to be modified and to be maintained at the set value to maintain the hot roller 10 at a controlled temperature.

The apparatus comprises a mechanical element 13, known as a delayed detachment element, whose displacement to the object can be integral with or independent of the joint motion of the hot roller with the melter, the said mechanical element 13 being suitable for modifying the path of the film by maintaining the film in contact with the object, in the portion k-k', subsequently to the transfer of the image to confer to the image the gloss, matt or holographed finish which is typical of the finish of the support. This mechanical element can be provided with a further element to blow air (reference 17 in FIG. 3) to the support that is devoid of the image if the suitably controlled ambient temperature does not permit the support to be detached without friction.

A non-stick support material, for example silicone-coated paper or PET (polyester/polyethylene terephthalate) silicone-coated (A) material, in a reel, printed with a thermoplastic ink, toner, by electrographic laser motor (not shown), is conveyed to the transfer, fixing and finishing apparatus, which is towed in a controlled manner that is synchronous with the printing motor or is unwound from pre-printed images reel. The transfer and fixing apparatus consists of a hot roller connected to the heating apparatus of said roller consisting of the melter 1 with a conveying chamber 3 for conveying the hot air blown by a blowing pump with adjustable flow where the heating is obtained by adjustable heating elements where this conveying chamber is provided with a section provided with an outlet that acts as a converging nozzle to increase the speed of the hot air directed onto the hot fixing roller 10 to be contained in a containing chamber 4 defined by the side walls 6 and 12, by the upper wall 14, lower wall 15 and adjacent to a portion of the hot roller 10, where said melter maintains hot air on a portion XX' of the roller 10, said hot fixing roller minimizing heat loss and maximizing the energy transferred superficially to the highly non-stick silicone rubber.

The printed support directed to the transfer section with the printed image facing the workpiece holder 11 receives hot air that flows from the containing chamber 4 thanks to the movable bounding wall 6 of said chamber when the chamber is moved away from the hot roller 10, on the section YY', where this flow has the task of softening the toner, thermoplastic ink, or of activating the coating of the printed images with non-thermoplastic inks (silkscreen printing inks, flexographic inks, inkjet, . . . ) to facilitate the following detachment of the ink from the support and reduce heat loss of the hot roller. The transfer unit, consisting of the presser roller 10, connected mechanically to the melter 1, advances to the object supported by the workpiece holder 11 whereas also the mechanical element 13, a delayed detachment element, acts on the film devoid of the image delaying the detachment of the film from the object after the transfer of the image. The combined pressure and temperature action enables the image to be transferred to the object, maintaining the film in contact with the k-k' section object enables the ink to adhere perfectly to the object and the finish to adhere perfectly to the object, making the object gloss, matt, holographed according to the features of the support.

The transfer, fixing and polishing apparatus of this invention enables the surface to be decorated with three-dimensional plastic or metal objects, achieving different advantages: increasing the quality of the transferred images, increasing the speed of the process and thus the productivity, increasing the flexibility of the process, reducing the energy used by making the process more environmentally friendly. The first of such objectives enables the toner to be fixed and thus to be enhanced whilst simultaneously increasing the appeal of the product owing to the coupling and the properties of the support to be transferred to the surface of the objects, avoiding the use of lacquer or other chemical products. The second of such objectives is due to heating by means of forced hot air of the surface of the hot roller 10 that is rotated continuously and due to preheating, also by forced hot air, of the support behind the printed images, before the transfer; in this manner said roller 10 acquires the temperature for melting, transferring and fixing the toner only to the outermost layer thereof, limiting energy consumption with respect to the fixing devices that spread the heat over the outer surface starting from the interior of the roller, by means of lamps or through electrical induction having high thermal inertia. Moreover, preheating the ink by means of forced hot air on the support behind the image sets up the ink for detachment, enabling the transfer speed to the object to be increased and the transfer to be optimized. The third objective is reached because of the possibility of adjusting all the parameters of the transfer process: pressure, temperature, sliding speed of the film so as to be able to use this apparatus to decorate the surface of objects by images printed with different technologies on supports with release by hot transfer maximizing the flexibility of the production system. The fourth objective is particularly clear using electrographic printing and the toner as an ink for which the fixing temperature is between 90° C. and 150° C. and because of which no coating is necessary on the support (monosilicone-coated PET), thus resulting in reduced consumption of electric energy and limited use of chemistry in the process.

The invention claimed is:

1. An apparatus for transferring, fixing and polishing images on plastic or metal surfaces of three-dimensional objects involving the use of different printing processes, said apparatus comprises:

with at least one hot fixing roller (10) connected mechanically to at least one generator (1) of blown hot air, by way of at least one conveying chamber (3) for hot air that contains at least one containing chamber (4) that maintains hot air on the surface of the hot fixing roller, said at least one conveying chamber disposed between the at least one generator and the at least one hot fixing roller at least one non-heated workpiece holder (11) opposite said hot fixing roller, (10), said holder being provided with continuous rotary movement, at least one delayed detachment element (13) provided with translating movement that is integral with or independent of the movement of the hot fixing roller, and said delayed detachment element being adapted to modify the path of the film to keep the film in contact with the three-dimensional object after the transfer of the image to the surface of the three-dimensional object in order to give the image a gloss, matt or holographed finish, depending on the finish of the support.

2. The apparatus according to claim 1 wherein the fixing roller (10) is provided with a continuous rotating movement whose speed, which is adjustable depending on the sliding speed of the support material of the printed images and of the object to be decorated, determines the dimension of the portion XX' of external surface of the roller (10) contiguous to the enclosing chamber and thus the thermal energy imparted to the roller (1 0); said roller (10), which is integral with the at least one conveying chamber (3), is provided with a translating movement to the workpiece holder (11) to enable the workpiece to be fitted to the workpiece holder (11), the latter being not heated and provided with rotational movement that is controlled and adjustable to enable coupling between the hot roller (10) and the surface of the object supported by the workpiece holder (11).

3. The apparatus according to claim 1 or 2 wherein the non-heated workpiece holder (11) is able to oppose the hot roller (10) when said hot roller (10) approaches said workpiece holder (11) to transfer the image; said workpiece holder (11) is made of a pin of hardened and tempered steel or of an aluminium screw tap, ‘spindle’, having the same geometry as the object to be decorated, matching completely with the volume of the object to be decorated; said workpiece holder (11), characterized by a rotational movement the speed of which is adjustable electronically on the basis of the sliding speed of the support of the images and depending on the type of support, the type of ink and the type of printing technique.

4. The apparatus according to claim 1, wherein the delayed detachment element (13) enables the ink to solidify by copying the quality of the surface of the film that represents the outer surface of the object.

5. The apparatus according to claim 4, wherein said mechanical element (13), the element of delayed detachment, is provided with elements that are suitable for blowing air onto the support of the images on the section K'-K" of the support, devoid of the image, to enable detachment of the support without friction of ink that has solidified and stuck to the object depending on the environmental conditions, in particular the ambient temperature.

6. The apparatus according to claim 1, wherein the conveying chamber (3) of said generator (1) comprises heating elements and collects air sent by a blower at a flow and pressure that are adjustable and conveys the air by an outlet section thereof, to a containing chamber (4).

7. The apparatus according to claim 6, wherein the containing chamber (4) defined by the lateral walls (6) and (12) an upper wall (14) and a lower wall (15) and adjacent to the hot roller (10) maintains the hot air on a surface portion XX' of the roller (10), minimizing heat loss.

8. The apparatus according to claim 6 or 7, wherein the containing chamber (4) defined by the side walls (6) and (12) has an adjustable wall (6) that is adjustable to permit a flow of hot air exiting and directed to the rear of the printed image, section YY', having the task of accelerating the transfer process, in order to soften, before the transfer, the thermoplastic ink in the case of a toner laser printing, or to activate the coating in the case of ink-jet, silk screen, offset and flexographic printing to thus enable the ink of the images to adhere to the objects through the effect of the combined action of pressure and temperature exerted by the hot roller (10) on the workpiece holder (11), reducing heat loss of the hot roller (10) that compresses the preheated film on the object.

9. The apparatus according to claim 6, which comprises further a temperature sensor (5) to control continuously the temperature of the hot air in the containing chamber (4).

10. The apparatus according to claim 1, which comprises a further temperature sensor (18) that is able to detect the temperature of the hot roller that, being interconnected with the control electronics, enables the temperature of the hot air to be modified and to be maintained at the set value to maintain the hot roller (10) at a controlled temperature.

11. The apparatus according to claim 1, wherein, upstream and in line with said apparatus, there is an electrographic printer capable of printing digital images on a non-stick surface of paper or plastic reel support (A) so that said apparatus transfers the pre-printed images from the non-stick support and fixes and polishes said images onto a three-dimensional object.

* * * * *